United States Patent
Itonaga et al.

(10) Patent No.: US 7,450,580 B2
(45) Date of Patent: Nov. 11, 2008

(54) APPLICATION LAYER MULTICAST SYSTEM AND INTERMEDIATE NODE THEREFOR

(75) Inventors: Wataru Itonaga, Tokyo (JP); Eiichi Kondoh, Tokyo (JP)

(73) Assignee: NEC Corporation, Tokyo (JP)

( * ) Notice: Subject to any disclaimer, the term of this patent is extended or adjusted under 35 U.S.C. 154(b) by 900 days.

(21) Appl. No.: 10/323,652

(22) Filed: Dec. 20, 2002

(65) Prior Publication Data
US 2003/0120917 A1    Jun. 26, 2003

(30) Foreign Application Priority Data
Dec. 20, 2001    (JP) .............................. 2001-387996

(51) Int. Cl.
H04L 12/28 (2006.01)
H04J 3/26 (2006.01)
G06F 15/16 (2006.01)
G06F 15/173 (2006.01)

(52) U.S. Cl. .................... 370/392; 370/432; 709/203; 709/238

(58) Field of Classification Search ............ None
See application file for complete search history.

(56) References Cited

U.S. PATENT DOCUMENTS

| | | | |
|---|---|---|---|
| 7,110,404 B1 * | 9/2006 | Temoshenko | 370/390 |
| 2002/0097728 A1 * | 7/2002 | Hinderks et al. | 370/395.52 |
| 2002/0120837 A1 * | 8/2002 | Maxemchuk et al. | 713/153 |
| 2003/0012202 A1 * | 1/2003 | Fukutomi | 370/395.52 |
| 2003/0028657 A1 * | 2/2003 | Thunquest et al. | 709/230 |
| 2003/0103517 A1 * | 6/2003 | Saxena | 370/432 |
| 2006/0120369 A1 * | 6/2006 | Chandran et al. | 370/390 |

FOREIGN PATENT DOCUMENTS

| | | |
|---|---|---|
| JP | A 10-242962 | 9/1998 |
| JP | 11-234267 | 8/1999 |
| JP | 11-313059 | 11/1999 |
| JP | A 2001-230774 | 8/2001 |
| JP | 2001-244976 | 9/2001 |

OTHER PUBLICATIONS

Postel et al. "User Datagram Protocol", RFC 768, Aug. 1980. ,.*
Nodoka Mimura et al., "RelayCast: Middleware for Peer-to-Peer Streaming Distribution," The Institute of Electronics, Information and Communication Engineers, Technical Report of IEICE, Jul. 2002, pp. 1-6.
Jibiki et al., "A Parallel Router Architecture Based on Sparse-combining with a Network", Journal of Information Processing, vol. 42, No. 12, Dec. 2001, pp. 2916-2927.
Pendarakis et al., "ALMI: An Application Level Multicast Infrastructure", Proceeding of the 3rd Usenix Symposium on Internet Technologies and Systems, 2001, pp. 49-60.

* cited by examiner

Primary Examiner—Wen-Tai Lin
(74) Attorney, Agent, or Firm—Young & Thompson (57) ABSTRACT

An application-layer multicast (ALM) system allowing high-speed ALM with precise routing control and simplified configuration. The routing control and data copying are separately performed with different hardware circuits: routing controller; and data copying device. The routing control is performed on the CPU of a computer, whereas the data copying is performed on a dedicated hardware circuit. This separate structure is employed in each intermediate node in the ALM network. The data copying device communicates with the routing controller within the same segment to manage the content data to be relayed by the intermediate system using a management ID uniquely assigned to the content data within the segment.

8 Claims, 10 Drawing Sheets

APPLICATION LAYER MULTICAST SYSTEM AND INTERMEDIATE NODE THEREFOR

BACKGROUND OF THE INVENTION

1. Field of the Invention

The present invention relates to an application layer multicast technique which allows multicast communications by application-layer processing.

2. Description of the Related Art

With the widespread use of broadband networks, attention has focused on multicast techniques that multicast streaming data such as real-time audio and video to all members of a particular multicast session group on a network. As a technique for such multicast communications, IP multicast has been known.

IP multicast is performed by looking at an IP multicast address of the destination IP address field of a packet. The IP multicast address is a set of addresses for multicast on IPv4 and IPv6. Intermediate nodes such as routers or L3switches between the sender and the receiver perform multicast routing based on the IP multicast address. In general, the routing control is performed at the application layer and the data forwarding and data copying are performed at the network layer.

To support IP multicast, however, all network systems including intermediate nodes must be multicast-enabled. Accordingly, there have been proposed several techniques of realizing multicast on the existing networks that do not support IP multicast.

For example, Japanese Patent Application Unexamined Publication No. 2001-230774 discloses a packet converter for realizing IP multicast via networks not supporting IP multicast. More specifically, in a data communication system where a server-side gateway is connected to a client-side gateway via the unicast network not supporting IP multicast, the server-side gateway converts IP multicast data to IP unicast data before sending to the unicast network. When receiving the IP unicast data from the server-side gateway, the client-side gateway converts it back to the original IP multicast data.

Japanese Patent Application Unexamined Publication No. 10-242962 discloses a multicast gateway system which receives a message as an IP multicast datagram from a sending host and makes a desired number of copies of the received message. The copies are sent as an IP unicast datagram to a plurality of registered receiving hosts that do not support IP multicast.

As another solution, application layer multicast (ALM) has been proposed. ALM performs routing control and data copying at the application layer and performs the data forwarding based on an unicast address. Accordingly, ALM advantageously uses an existing unicast IP network at the network layer.

Figure 1:
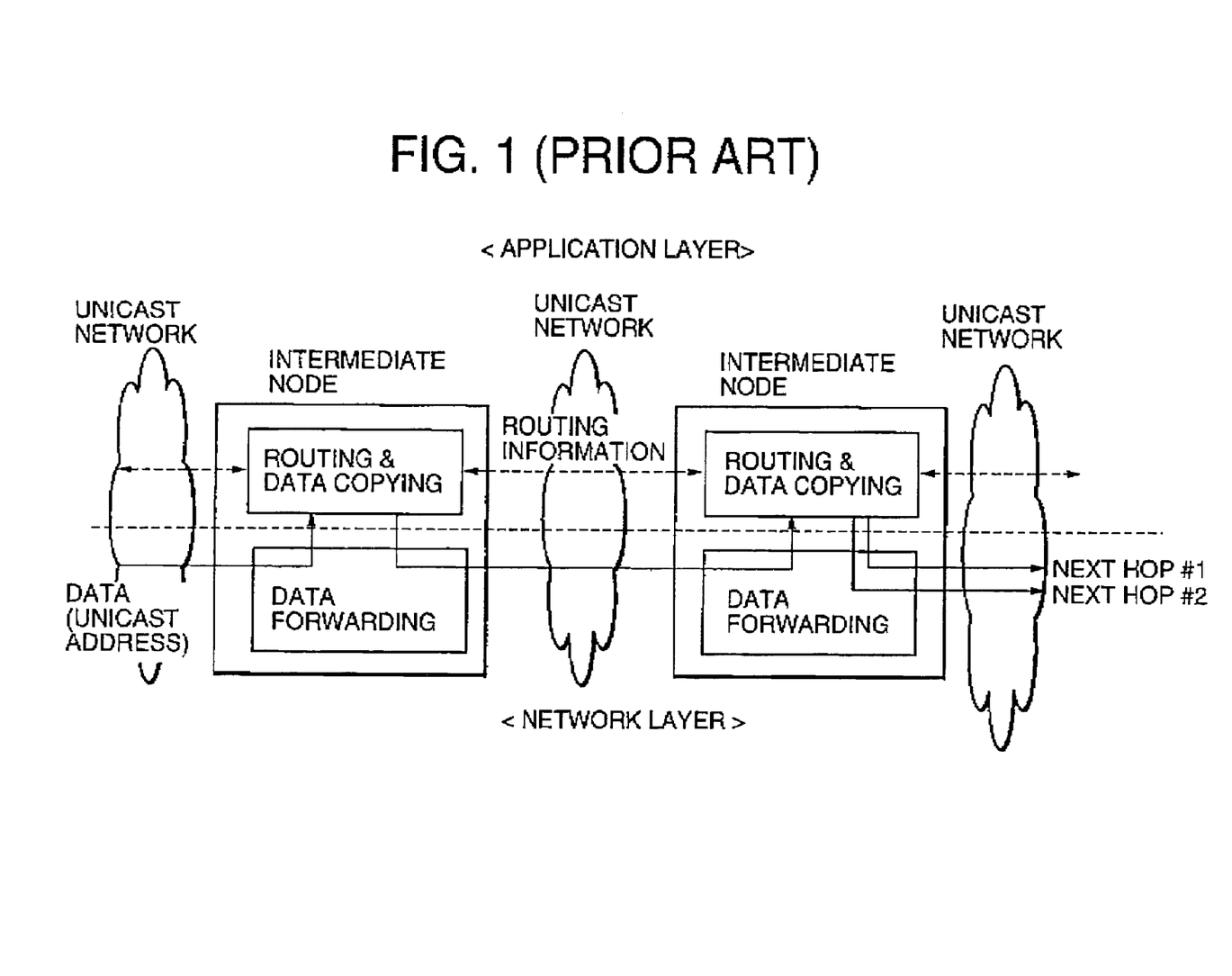
FIG. 1 is a diagram showing a network for explanation of a conventional ALM system.

Referring to FIG. 1, an intermediate node has the following functions: routing control for controlling a multicast tree; and data copying for copying multicast data to be transferred to downstream nodes. The data copying is preferably performed at high speeds so as to avoid occurrence of delays in transferring real-time streaming data such as moving images.

However, the conventional application layer multicast system performs the data copying on the CPU of a work station or personal computer. Accordingly, it is difficult to further increase the data copying speed, compared with the case of using a dedicated hardware circuit such as ASIC (Application specific Integrated Circuit).

In addition, in the case where both the routing control and data copying functions are working on the same CPU, the load of data copying adversely affects the routing control processing, which may cause the routing control not to operate normally.

SUMMARY OF THE INVENTION

An object of the present invention is to provide an application layer multicast system and intermediate node therefore, allowing high-speed application layer multicast with precise routing control and simplified configuration.

According to the present invention, the routing control and the data copying are separately performed with different hardware circuits. The routing control is performed on the CPU of a computer, whereas the data copying is performed on a dedicated hardware circuit. Such a separate structure is employed in an intermediate node in the ALM system, allowing the data copying to operate at high speeds.

According to the present invention, an application-layer multicast system for multicast content data from a sender too a plurality of receivers through an intermediate system on a unicast network based on a data request message of each of the receivers, wherein the intermediate system includes: a routing controller controlling application-layer multicast routing based on the data request message at application layer; and at least one data copying device, each of which is made of a dedicated hardware circuit, for copying content data received from upstream to deliver each of copies of the content data to downstream based on the application-layer multicast routing, wherein said at least one data copying device communicates with the routing controller within the same segment to manage the content data to be relayed by the intermediate system using a management identification uniquely assigned to the content data within the segment.

According to an aspect of the present invention, the intermediate system comprises a plurality of intermediate nodes, each of which comprises a routing controller and a data copying device, wherein each of said at least one data copying device works at layer 3 or lower.

The routing controller may include: a route manager for managing route information indicating a correspondence between the content data and the management identification, an upstream device address and at least one next hop address; and a controller for updating the route information when an update of the route information occurs and sending the update of the route information to the data copying device paired with the routing controller, and, when receiving the content data from upstream, replacing a destination address of the content data with the management identification before sending it to the data copying device.

The data copying device may include: a copy entry controller for managing copy entry information indicating a correspondence between the management identification and said at least one next hop address; and a data copying section for copying the content data received from the routing controller and replacing a destination address of the content data with a corresponding one of said at least one next hop address before delivering.

The management identification is preferably an IP multicast address.

The route information and the copy entry information may further include quality of service (QoS) of a route to said at least one next hop address.

According to another aspect of the present invention, the routing controller manages a plurality of data copying devices, wherein each of the data copying devices works at layer 4 or lower.

The routing controller may include: a route manager for managing route information indicating a correspondence between the content data and the management identification, an upstream device address and at least one next hop address; and a controller for updating the route information when an update of the route information occurs and sending the update of the route information to data copying devices.

The data copying device may include, a copy entry controller for managing copy entry information indicating a correspondence between the management identification and said at least one next hop address; and a data copying section for copying the content data received from upstream and replacing a destination address of the content data with a corresponding one of said at least one next hop address before delivering.

The management identification is preferably a port number corresponding to the content data.

DESCRIPTION OF THE PREFERRED EMBODIMENTS

First Embodiment

ALM Network System

Figure 2:
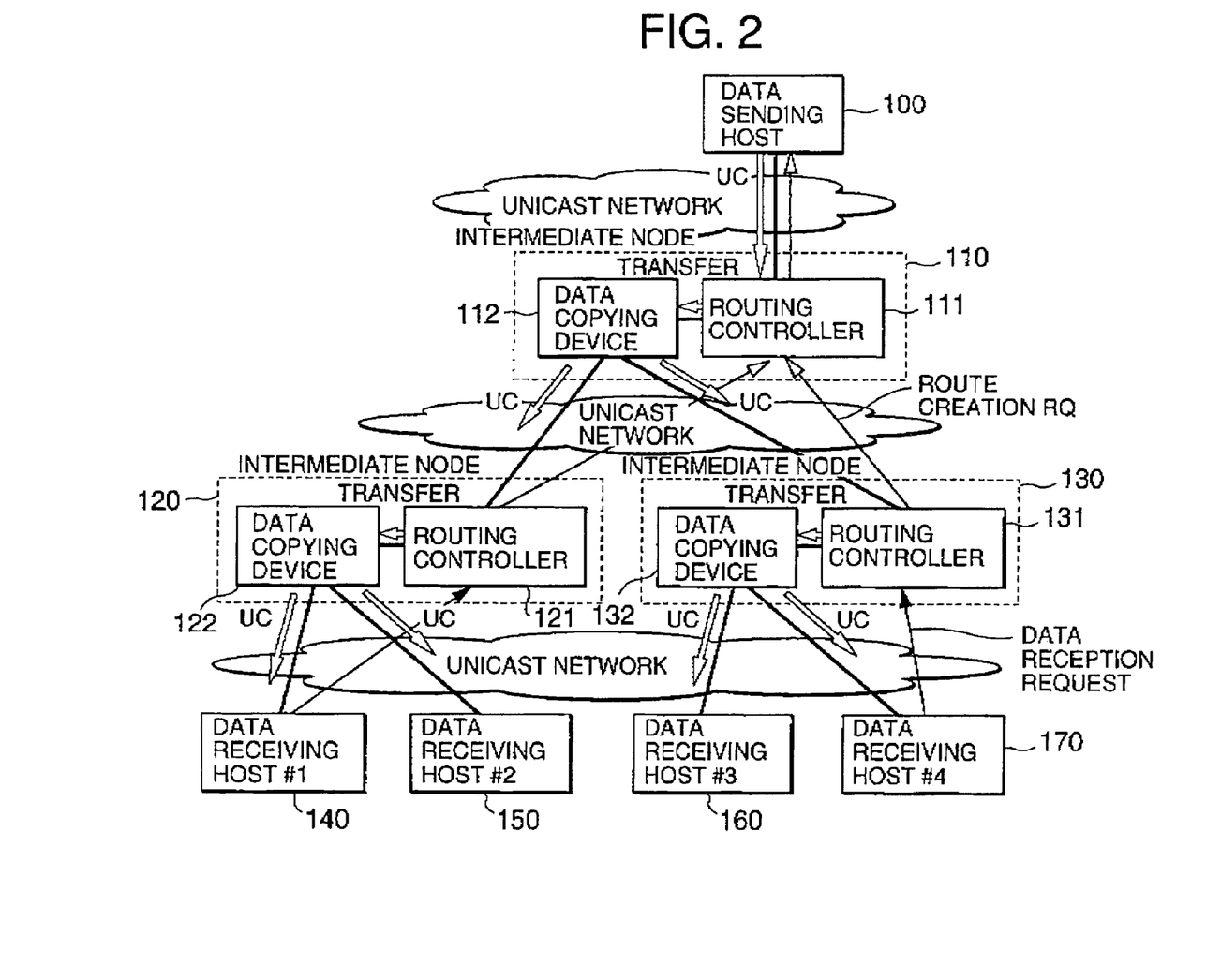
FIG. 2 is a diagram showing an application layer multicast system according to a first embodiment of the present invention.

As shown in FIG. 2, it is assumed for simplicity that a data sending host 100, intermediate nodes 110, 120 and 130, and data receiving hosts 140, 150, 160 and 170 are directly connected to a unicast network, where the data sending host 100 sends unicast data labeled "UC" to respective ones of the data receiving hosts 140, 150, 160 and 170 through the intermediate nodes 110, 120 and 130 in the unicast network.

In the present embodiment, each of the intermediate nodes 110, 120 and 130 has such a structure that a routing controller (111, 121 or 131) and a data copying device (112, 122 or 132.). are separated physically; or in terms of hardware, but connected to each other in the same segment. The transfer data at each intermediate node is managed by using a common management ID between the routing controller and the data copying device. The management ID is also used to transfer the data to a next hop node. The use of the management ID is restricted within the same segment.

In the present embodiment, an IP multicast address is used as the management ID not for IP multicast routing but for data copying of the data copying device at a low layer. The use of an IP multicast address as the management ID allows data identification at layer 3 and thereby the data copying device can handle layer-3 processing. An existing IP multicast-capable router may be used as the data copying device.

The data sending host 100 delivers ALM data to the data receiving hosts 140, 150, 160 and 170 at the same time. The ALM data may be also called content, object and the like, especially is real-time streaming data such as audio and video. As described later, for each ALM data, an ALM delivery tree is formed from the data sending host 100 to the data receiving hosts 140, 150, 160 and 170 through the intermediate nodes 110, 120 and 130. The ALM delivery tree is dynamically changed with data receiving hosts joining or leaving the group at any time.

Each of the data receiving hosts 140, 150, 160 and 170, when requesting data reception, sends a data reception request message to the routing controller of the nearest intermediate node. For example, the data receiving host 170 sends the data reception request message to the routing controller 131 of the intermediate node 130. The data reception request message includes at least a data ID (content ID) uniquely identifying each content in the ALM network. The content ID may be described as in the case of URL, for example. When the intermediate node has received the data reception request message, intermediate nodes construct a delivery route to the data receiving host as described later.

Each of the intermediate nodes 110, 120 and 130 is a relay node by which ALM data is transferred from upstream to downstream through the constructed routes. Each intermediate node has the routing controller (111, 121 or 131) and the data copying device (112, 122 or 132) separately provided and connected to each other therein.

When having received a data reception request or a route creation request from a data receiving host or downstream nodes, the routing controller performs construction of a delivery route through which delivery data is to be transferred. Thereafter, the routing controller receives delivery data from an upstream node and transfers it to the data copying device in the same segment. The data copying device copies the delivery data and sends the copies of the same data as unicast data to respective ones of downstream nodes or data receiving hosts according to the constructed routes.

Intermediate node

Figure 3:
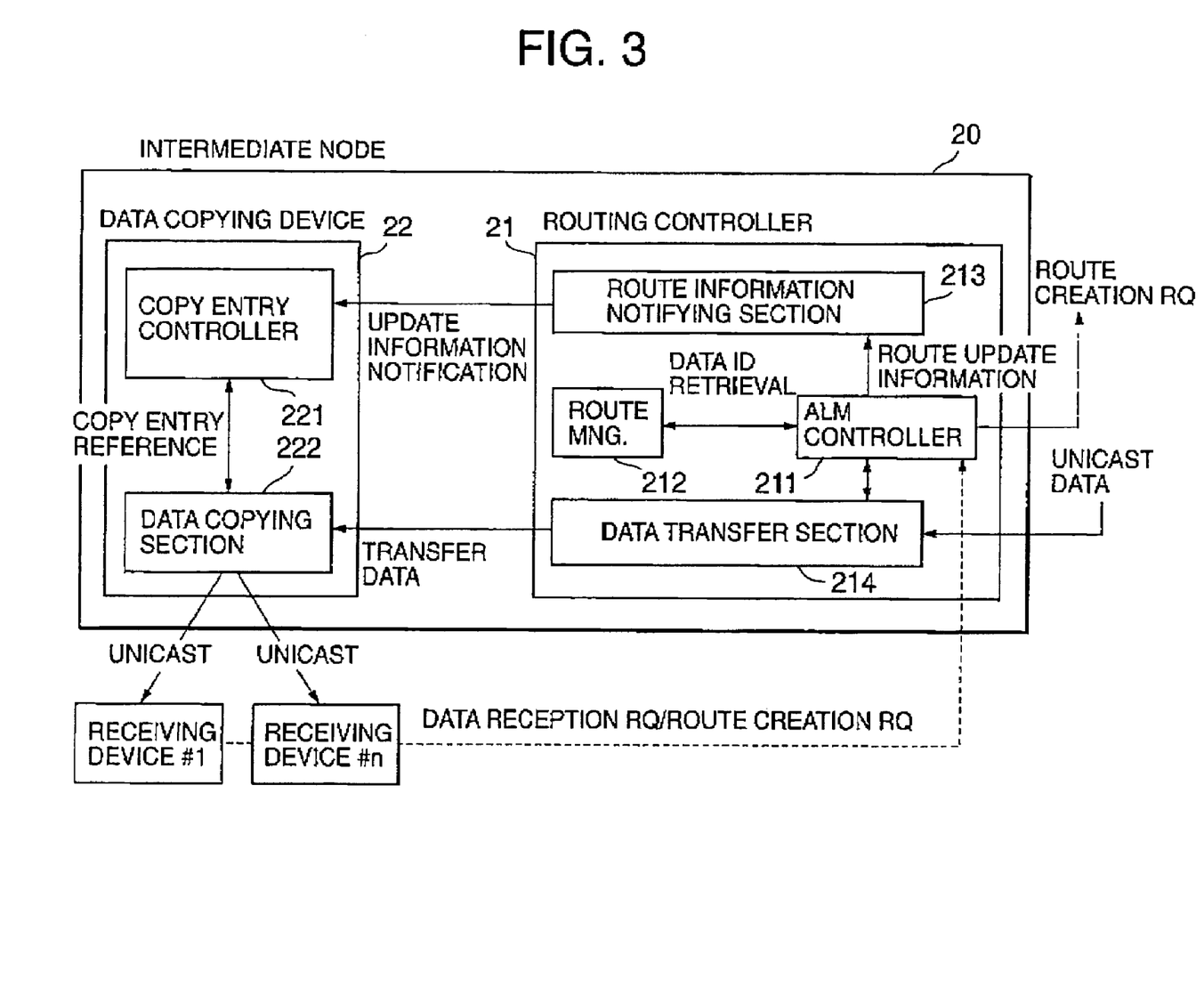
FIG. 3 is a diagram showing an intermediate node in the application layer multicast system according to the first embodiment.

Referring to FIG. 3, each of the intermediate nodes 110, 120 and 130 is denoted by reference numeral 20. An intermediate node 20 manages information regarding content data relayed by itself with a management ID assigned to the content data. The intermediate node 20 is physically divided into the routing controller 21 and the data copying device 22, which are connected to each other and use the same management ID (here, IP multicast address) to handle the relayed content data.

The routing controller 21 takes charge of complex routing control processing such as ALM delivery route construction, update and maintenance, and information management on data receiving hosts, and performs these on a CPU at the application layer. The routing controller 21 has an ALM controller 211, a routing management 212, a route information notifying section 213, and a data transfer section 214.

The data copying device 22 takes charge of copying transfer data received from the routing controller 21 based on copy entries and transferring the copies to downstream next hop nodes. In the present invention, the data copying device 22 is formed by dedicated hardware circuit such as ASIC to achieve high-speed processing with suppressing delays at the intermediate node. The date copying is layer-3 or below processing such as conversion of the destination IP address of the data from IP multicast address to the next-hop node IP address. The data copying device 22 manages information on next hop nodes as copy entry information (registered information). Here, a next hop node is the routing controller of a downstream intermediate node or a data receiving host.

1) Routing Controller

In the routing controller 21, the ALM controller 211 performs ALM routing control by periodically exchanging routing control information with routing controllers of other intermediate nodes on the ALM network. The ALM routing control handles the location information of the data sending host 100, information of other routing controllers and the like. The ALM controller 211 controls the route manager 212 to manage the information about the content data to be relayed. The ALM controller 211 further controls the route information notifying section 213 so as to notify the data copying device 22 of updated route information, and the data transfer section 214 so as to transfer received data by converting its destination address to a corresponding data ID retrieved from the route manager 212.

The route manager 212 manages the to-be-relayed content information that is information about its content ID, delivery tree, next hop node, and the like. Hereinafter, this managed information is called route information 30. Specifically, the route manager 212 manages correspondence between content ID and management IP. Hereafter, a management ID corresponding to a content ID is called data ID. It should be noted that the content ID is uniquely assigned to each content data in the ALM network.

Figure 4A:
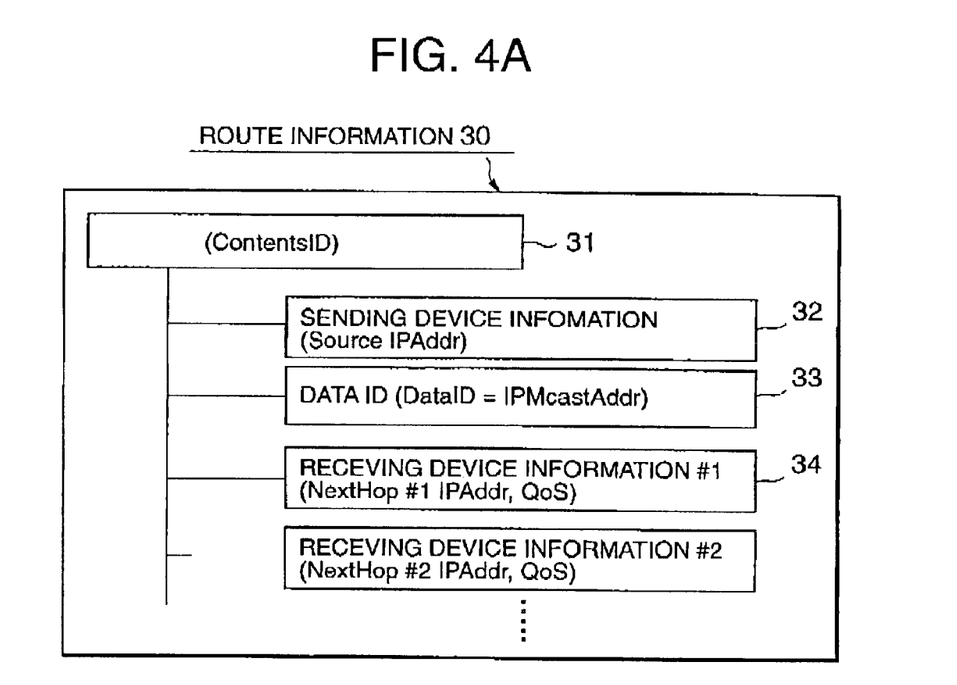
FIG. 4A is a schematic diagram showing routing information managed by a routing manager.
Figure 4B:
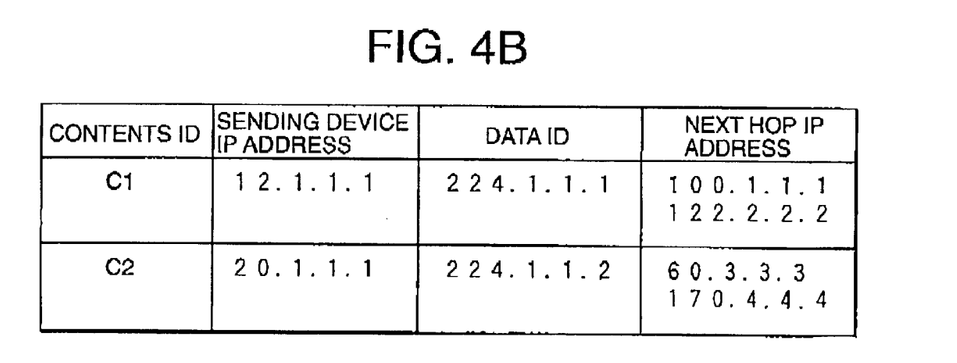
FIG. 4B is a schematic diagram showing an example or routing information as shown in FIG. 4A.

Referring to FIGS. 4A and 4B, the route information 30 is created for each content ID 31, which includes sending device information (Source IP Address) 32, data ID (—IP multicast address) 33, and receiving device information #1, #2, . . . (Next hop device IP address, QoS) 34. The sending device information 32 is IP address of the sending device host 100 or an upstream intermediate node. The data ID 33 is the management ID (here, IP multicast address) corresponding to the content ID 31 in the intermediate node. The receiving device information 34 is information about next hop nodes, including their IP addresses and the quality of service (QoS) thereof.

The route information notifying section 213, when receiving route update information from the ALM controller 211, notifies the data copying device 22 of the updated route information 30. When the route information managed in the route manager 212 has been changed, the ALM controller 211 outputs route update information to the route information notifying section 213.

The data transfer section 214 receives unicast content data (IP datagram at layer 3) from upstream and reads out information such as the source IP address and content ID included in the unicast data. The ALM controller 211 uses the source IP address and the content ID to search the route manager 212 for a corresponding data ID (here, IP multicast address). The retrieved data ID is output to the data transfer section 214. The data transfer section 214 overwrites the retrieved data ID on the destination IP address field of the IP header of the received unicast data to output it to the data copying section 222 of the data copying device 22. The retrieved data ID may be stored in the data transfer section 214 for future data transfer 2) Data Copying Device In the data copying device 22, the copy entry controller 221 manages copy entry information (registered information) 40, which are used to transfer content data to next hop nodes. When having received update information of the route information 30 from the route information notifying section 213, the copy entry controller 221 performs addition, deletion and update of the copy entry information 40.

Figure 5:
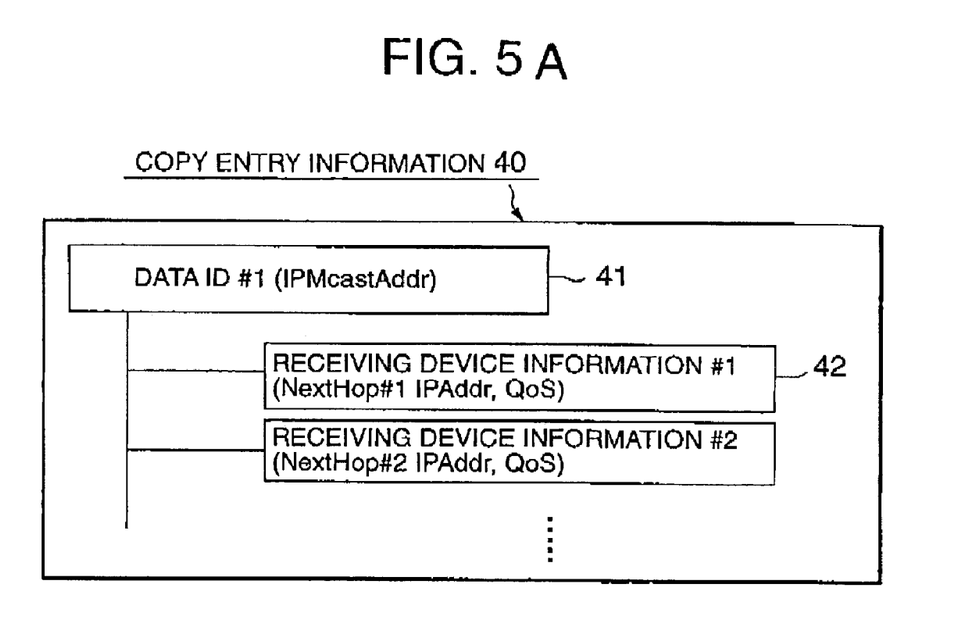
FIG. 5A is a schematic diagram showing the structure of a copy entry managed by a copy entry controller.
FIG. 5B is a schematic diagram showing an example of the copy entry as shown in FIG. 5A.
Figure 5B:
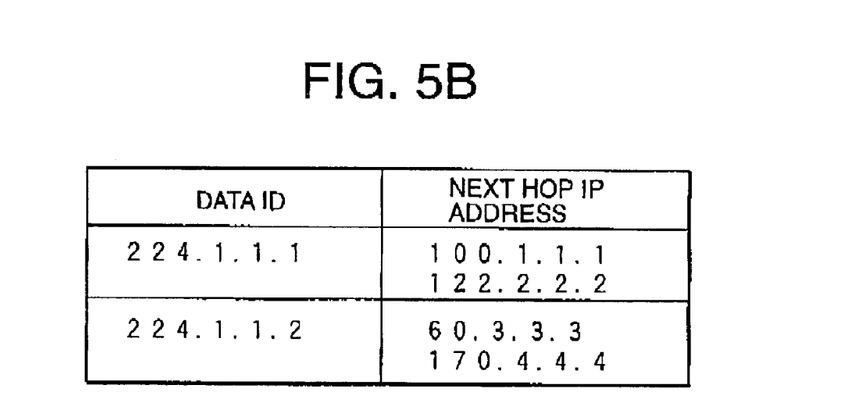

Referring to FIGS. 5A and 5B, the copy entry information 40 includes copy entries 42 for each data ID 41 that is a root entry. Each of the copy entries 42 is information of a next hop node to which a copy of the content data is to be transferred, including at least the IP address of the next hop node or a data receiving host. Each of the copy entries 42 may include QOS information indicating the quality of a route to the next hop node or the data receiving host. Data ID #1, #2, . . . is the same as the data ID 33 of the route controller 21 to manage the content data to be relayed.

The number of copy entries is the number of copies of the content data. The copy entry controller 221 performs addition, deletion and update of the copy entries depending on the update information received from the route information notifying section 213. If a data ID as a root entry includes no copy entries, the data ID itself is deleted from the copy entry information 40.

The data copying section 222 receives the content data from the data transfer section 214. Since the received content data has the data ID as the destination IP address, the data copying section 222 identifies each content data by looking at the data ID and makes copies of the content data based on the copy entry information 40 managed by the copy entry controller 221. The data copying section 222 overwrites IP address of each copy entry 42 on the destination IP address field of a corresponding copy of the content data. In this manner, the respective copies are sent as unicast data to the next hop nodes each indicated by the copy entries of the copy entry information 40.

In the first embodiment as shown in FIG. 2, a routing controller is paired with a data copying device within the same segment to form an intermediate node. Since the routing controller and the data copying device are separated in hardware, IP datagrams can be used to transfer necessary information and content data in the ALM network as shown in FIGS. 6A-6C.

Figure 6A:
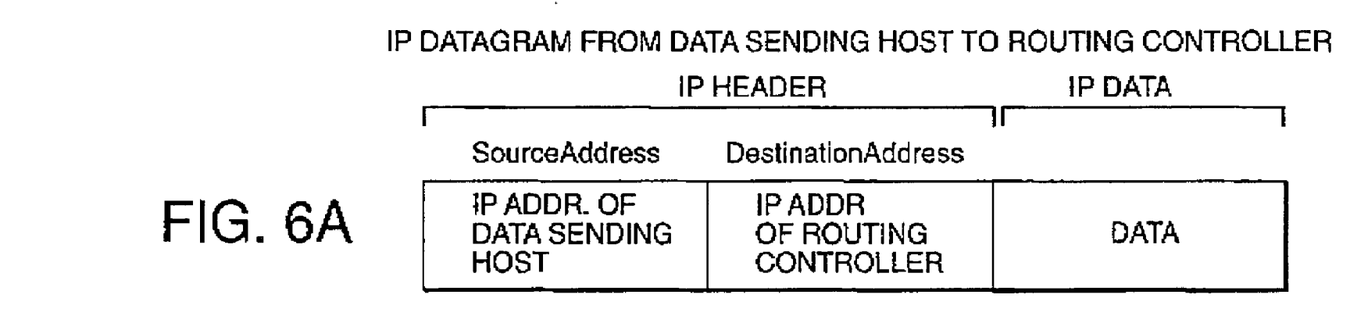
FIG. 6A is a schematic diagram showing the format of a IP datagram from a data sending host to a routing controller.
Figure 6B:
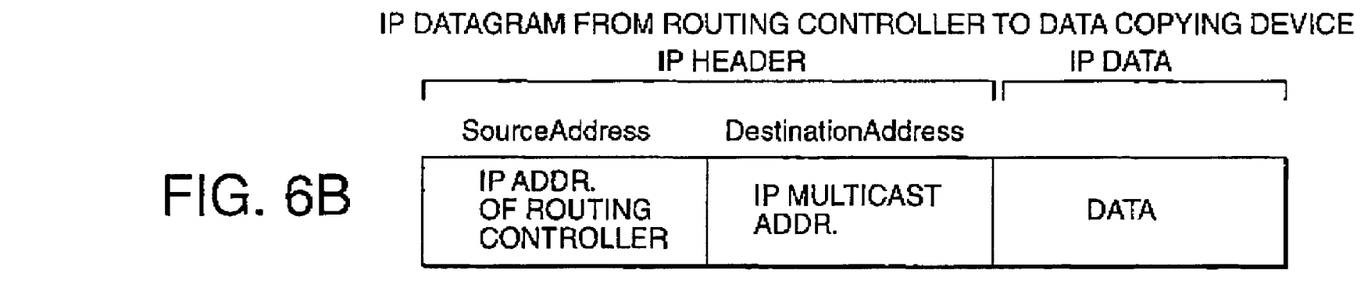
FIG. 6B is a schematic diagram showing the format of a IP datagram from the routing controller to a data copying device.
Figure 6C:
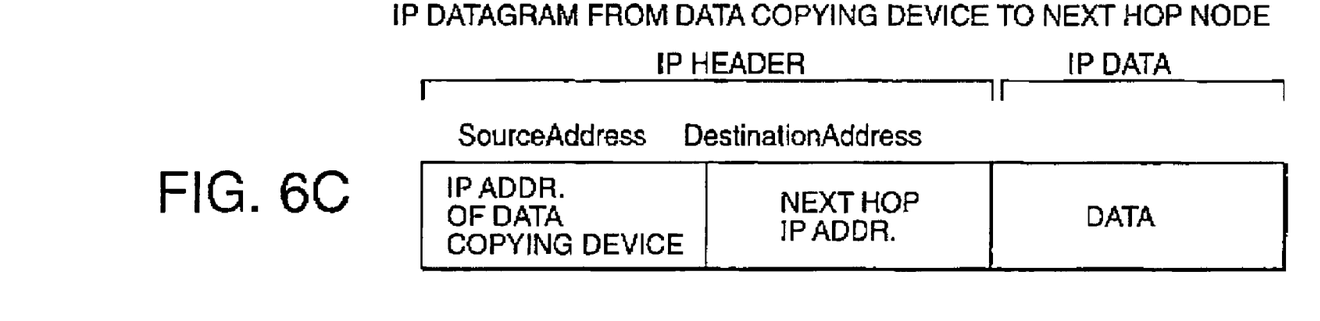
FIG. 6C is a schematic diagram showing the format of a IP datagram from the data copying device to a next hop node.

FIG. 6A shows the format of an IP datagram transferred from the data sending host 100 to the routing controller 111, FIG. 6B shows the format of an IP datagram transferred from the routing controller 111 to the data copying device 112, and FIG. 6C shows the format of an IP datagram transferred from the data copying device 112 to the routing controllers 121 and 131 of the next hop nodes 120 and 130.

3) Operations of Routing Controller

As described before, when requesting a desired content, a data receiving host sends a data reception request message to the routing controller of the nearest intermediate node.

Figure 7:
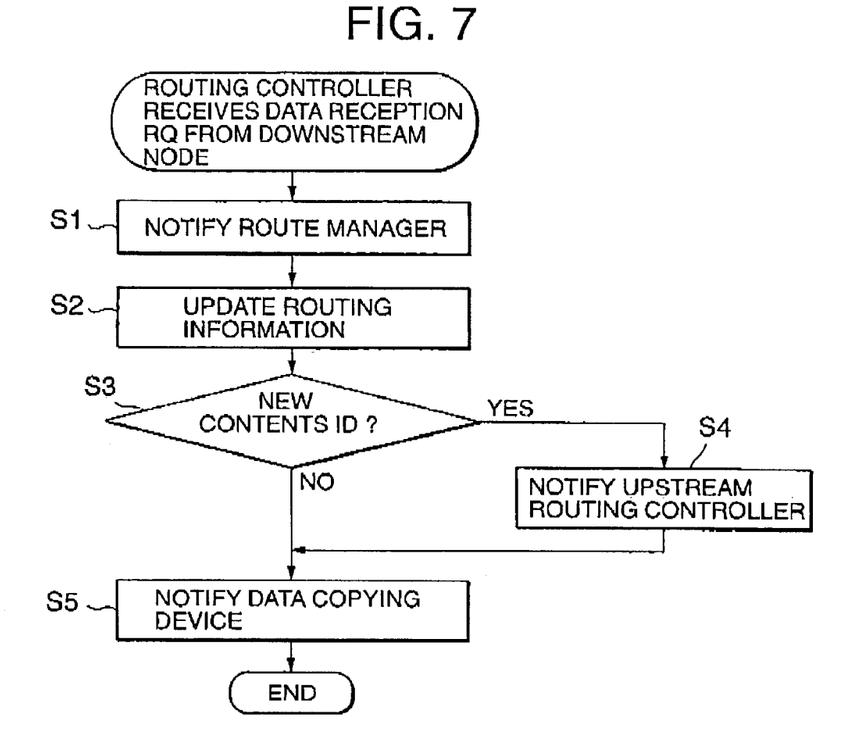
FIG. 7 is a flow chart showing an operation of the routing controller when receiving a data reception request message.

Referring to FIG. 7, when receiving the data reception request message from downstream, the ALM controller 211 notifies the route manager 212 (step S1), and performs update of the route information 30 (step S2). The ALM controller 211 determines based on the route information 30 whether a new content ID is requested (step 33).

When a new content ID is requested (YES in step S3), the ALM controller 211 creates a route creation request message and sends it to the routing controller 21 of an upstream intermediate node (step S4). After the step S4 or when the requested content ID has been already registered in the route information 30 (NO in step S3), the route information notifying section 213 notifies the copy entry controller 221 of the data copying device 22 of update of the route information 30 (step S5). The update information includes data ID 33 of the new content and receiving device information 34 of a delivery route.

Upon receipt of the update information, the copy entry controller 221 updates the copy entry information 40. If no root entry of content ID is included, a root entry of the content ID is created and receiving device information is added thereto. If a root entry of the content ID has been already created, now receiving device information 42 is added to the root entry.

An upstream intermediate node which receives the route creation request message that was sent at the step S4 performs the similar steps S1-S5. Such route creating steps are repeatedly performed at the upstream intermediate nodes to construct a delivery route from the data sending host 100 to each of all the data receiving hosts that sent the data reception request message. When an upstream node is the data sending host 100, the routing controller 21 requests the transmission of the requested content data from the data sending host 100. In this manner, the desired content data is delivered from the data sending host 100 to each of all the data receiving hosts that sent the data reception request message.

In the ALM network having the delivery tree as described above created therein, a new data receiving host sends a data reception request message to the routing controller of the nearest intermediate node. For example, when the data receiving host 140 (see FIG. 2) sends the data reception request message to the routing controller 121 of the intermediate node 120, a new delivery route from the intermediate node 120 to the data receiving host 140 is added to the existing delivery tree. Accordingly, the data copying device 122 makes two copies of a received corresponding content data and sends them to respective ones of the data receiving hosts 140 and 150.

The data sending host 100 first sends content data as unicast data to the routing controller 111 of the intermediate node 110.

Figure 8:
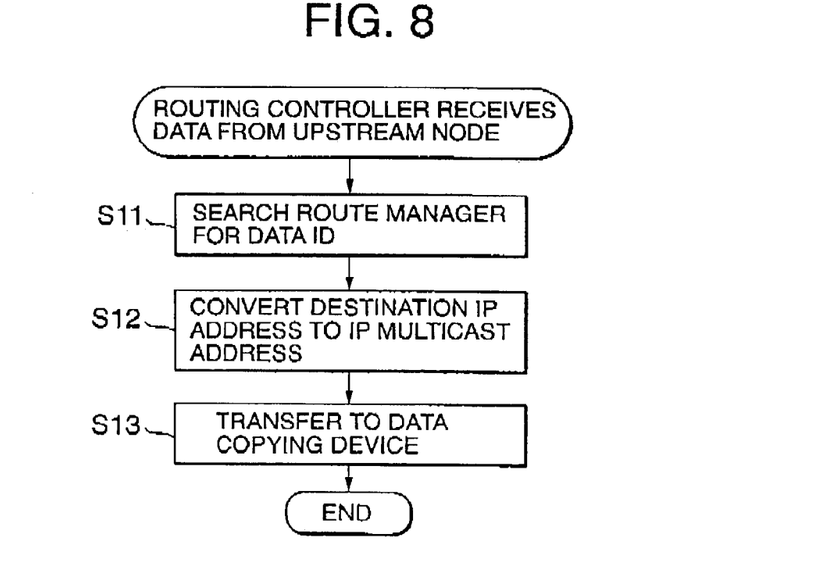
FIG. 8 is a flow chart showing an operation of the routing controller when receiving data.

Referring to FIG. 8, the data transfer section 214 of the routing controller 21 receives the content data from upstream (here, the data sending host 100). The ALM controller 221 looks at the content ID and the source address included in the received unicast data to search the route manager 212 for a data ID corresponding to the content ID (step S11). The found data ID is output to the data transfer section 214. The data transfer section 214 converts the destination IP address of the received unicast data to the retrieved data ID (step S12) and outputs it to the data copying section 222 of the data copying device 22 (step 513).

Figure 9:
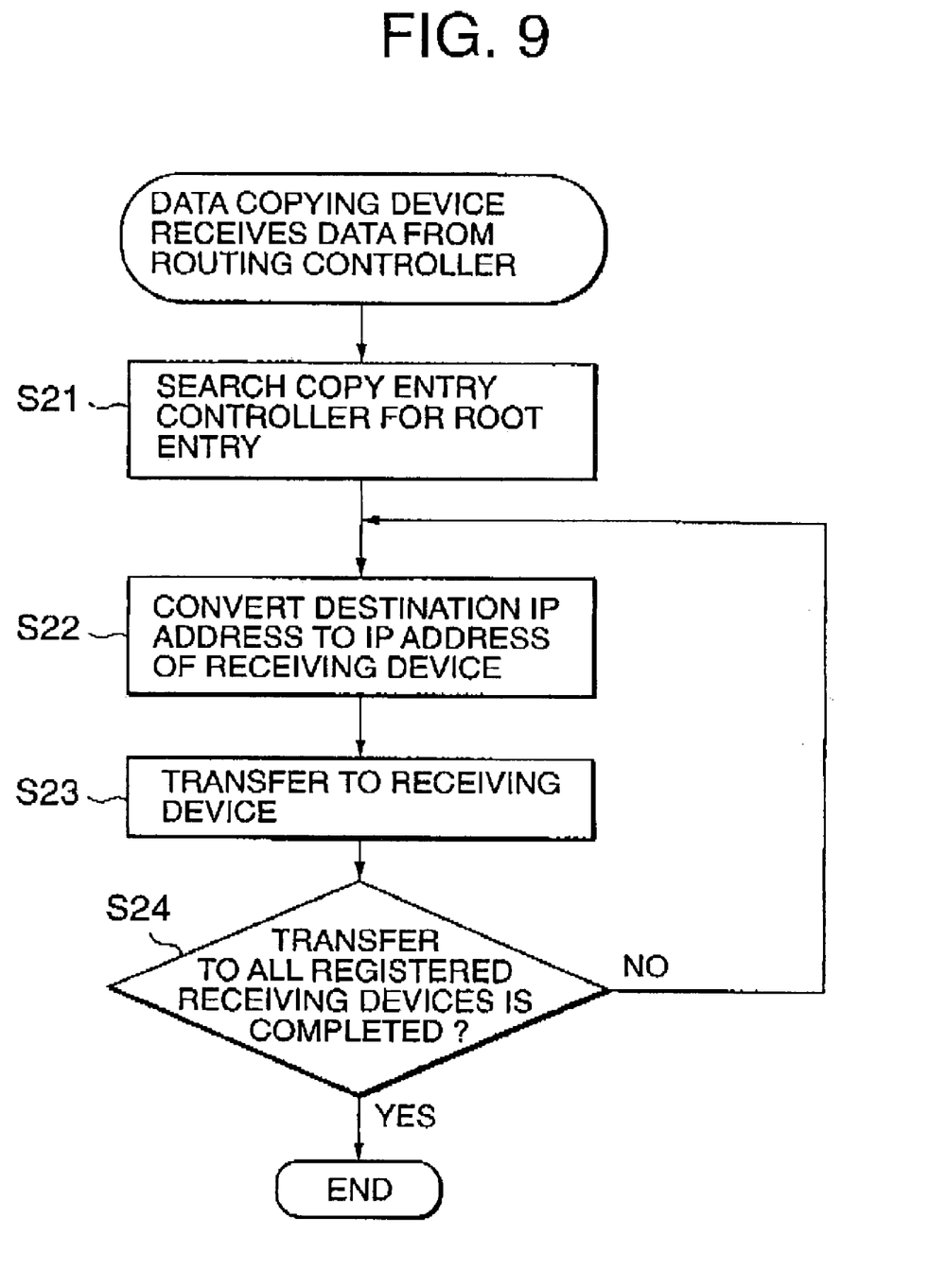
FIG. 9 is a flow chart showing an operation of the data copying device when receiving transfer data.

Referring to FIG. 9, the data copying section 222 of the data copying device 22 receives the content data from the data transfer section 214. The data copying section 222 uses the data ID of the received content data to search the copy entry information 40 of the copy entry controller 221 for a root entry 41 and check receiving device information 42 of the root entry 41 (step S21). Thereafter, the data copying section 222 converts the destination IP address of the content data to IP address included in the receiving device information 42 (step S22) and sends the content data as unicast data to the IP address of the receiving device (step S23).

Subsequently, the data copying section 222 determines whether all registered receiving devices in the root entry has been selected (step S24). The steps S22 and S23 are repeated until the transfer to all registered receiving devices has been completed. In other words, the data copying section 222 makes copies of the content data based on the copy entry information 40 managed by the copy entry controller 221 and unicasts the respective copies to the next hop nodes each indicated by the copy entries of the copy entry information 40.

Second Embodiment

In the first embodiment as shown in FIG. 2., the routing controller 21 and the data copying device 22 are loosely coupled within the same segment. Accordingly, it is not necessary to connect then on a one-to-one basis.

Figure 10:
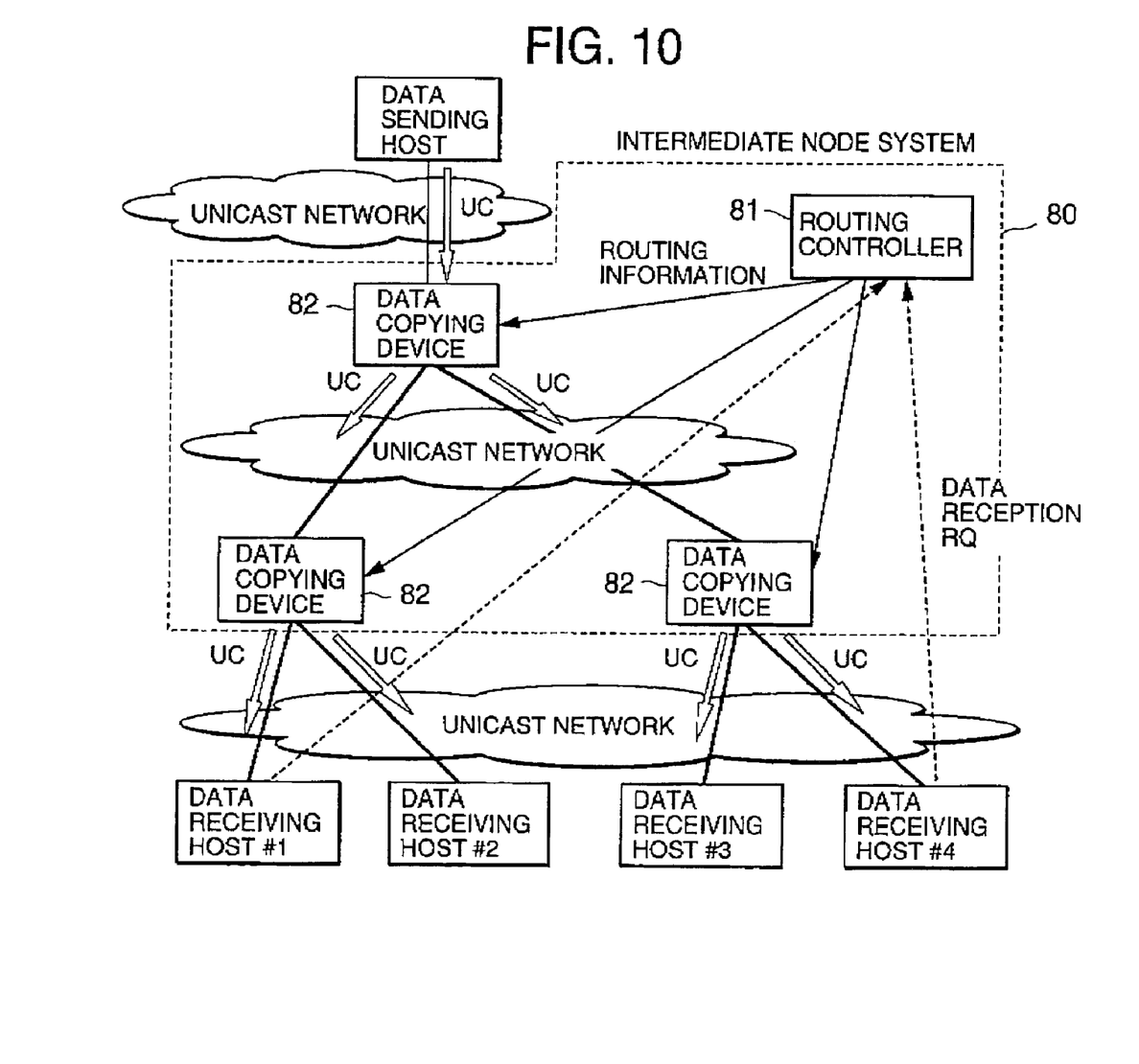
FIG. 10 is a diagram showing an application layer multicast system according to a second embodiment of the present invention.

As shown in FIG. 10, it is possible to connect a single routing controller 81 to a plurality of data copying devices 82 to form an intermediate node system 80. A plurality of intermediate node systems 80 may exist between the data sending host and a data receiving host. In an intermediate node system 80, the routing controller 81 exchanges routing control information with other routing controllers 81 to construct a delivery route, which is similar to the first embodiment.

The routing controller 81 in the second embodiment manages route information for the data copying devices 82 and, when the route information has been updated due to occurrence of a data reception request, notifies relevant data copying devices to update its copy entry information.

In the second embodiment, delivery data is transferred through an intermediate node system 80 with bypassing the routing controller E1. Accordingly, an IP multicast address cannot be used as the management ID (data ID) between the routing controller 81 and the data copying devices 82 as in the case of the first embodiment. In the second embodiment, instead of an IP multicast address, a port number is used as data ID to identify each content.

More specifically, the routing controller 81 notifies the data copying devices 82 of a port number corresponding to a relayed content and thereby each data copying device updates its copy entry information. In the data copying device 82, the copy entry information is composed of a port number as data ID (root entry) and corresponding receiving device information (copy entry). Accordingly, when a data copying device 82 receives content data such as UDP packet having the port number assigned thereto from an upstream data copying device or the data sending host, the data copying device 82 performs data copying based on the copy entry information and sends the copies as unicast date to respective ones of the data copying devices 82. Since the port number is used as data ID, the data copying device 82 of the second embodiment can handle layer-4 processing.

Figure 11:
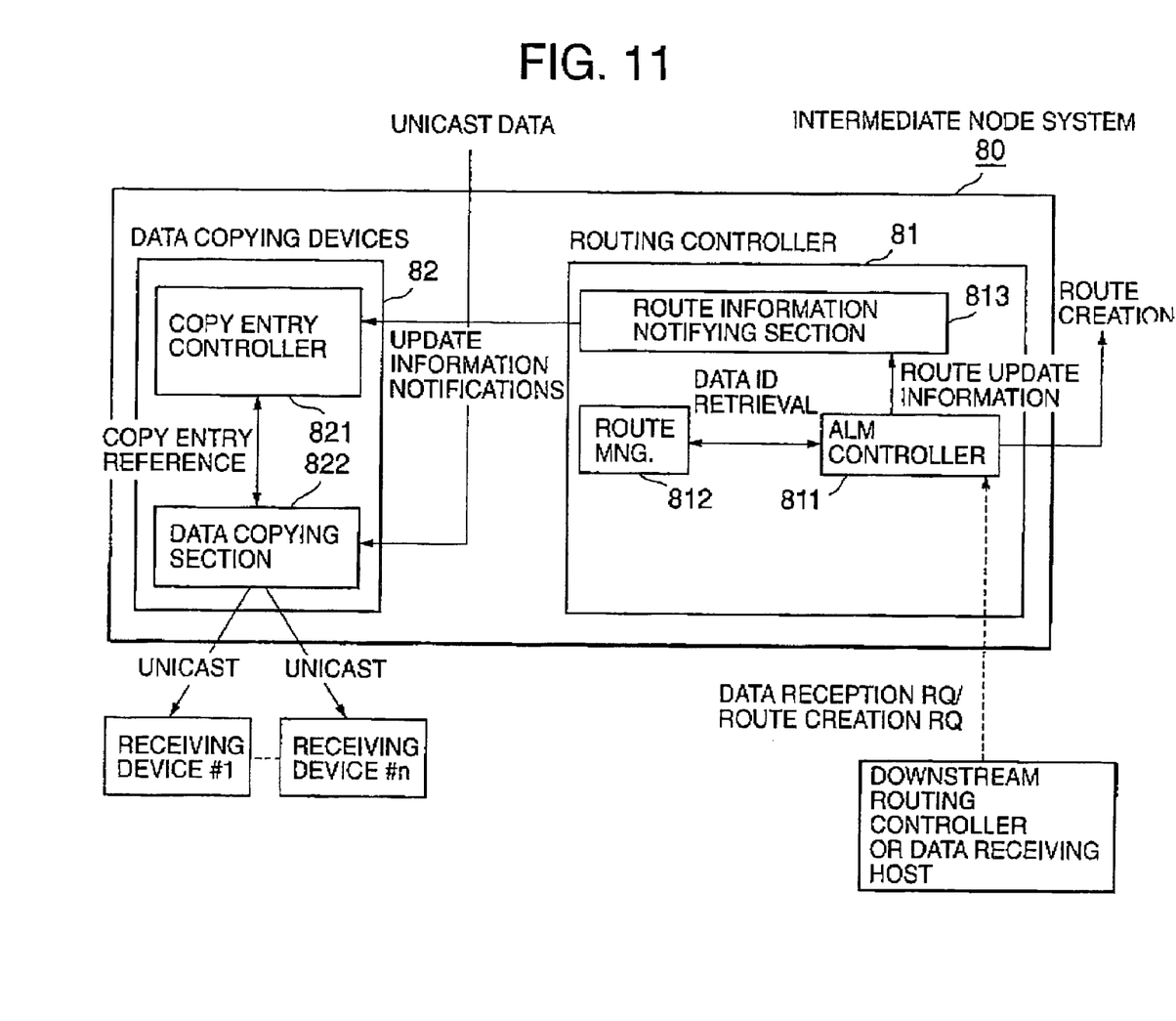
FIG. 11 is a diagram showing an intermediate node in the application layer multicast system according to the second embodiment.

As shown in FIG. 11, the intermediate node system 80 can be simply depicted, which includes the routing controller 81 and data copying devices 82. The routing controller has an ALM controller 811, a route manager 812, and a route information notifying section 813. Each of the data copying devices 82 has a copy entry controller 821 and a data copying section 822. As described above, since the port number is used as data ID, the routing controller 81 is not provided with the data transfer section 214 (see FIG. 3) and the data copying section 822 directly receives the unicast data from upstream.

In the second embodiment, the ALM controller 811, the route manager 812 and the route information notifying section 813 have the substantially same functions as the ALM controller 211, the route manager 212 and the route information notifying section 213 of FIG. 3. Similarly, the copy entry controller 821 and the data copying section 822 have the substantially same functions as the copy entry controller 221 and the data copying section 222 of FIG. 3 except that the data copying section 822 makes copies of received unicast data using its port number and the copy entry information of the copy entry controller 821 to send the copies as unicast data to respective ones of downstream devices.

It should be noted that a combination of intermediate nodes of the first embodiment and intermediate node systems of the second embodiment may be used in the ALM network. The present invention can be applied to such a combined ALM network.

As described above, according to the present invention, existing unicast network and IP multicast-capable router can be used to realize IP multicast. The routing control and the data copying are separately performed with different hardware circuits in each of intermediate nodes between a sending host and plural receiving hosts. Since the routing control needs complex route computation, the routing control is performed by running a software program on the CPU of a computer. On the other hand, the data copying is relatively simple but needs high speeds. Therefore, the data copying is performed on a dedicated hardware circuit. Such a separate structure is employed in each intermediate node in the ALM system, allowing high-speed data copying of real-time streaming data such as audio and video.

According to the first embodiment, an IP multicast address is used as a data management ID and therefore only layer 3 or lower processing is performed. Accordingly, the data copying device can be obtained by only a little function addition to an existing multicast-capable router, resulting in easy implementation.

According to the second embodiment, a single routing controller can manage a plurality of data copying devices while each data copying device requires processing at up to layer 4.

The invention claimed is:

1. An application-layer multicast system for multicast content data from a sender to a plurality of receivers through an intermediate system on a unicast network based on a data request message of each of the receivers, wherein the intermediate system comprises:

a routing controller controlling application-layer multicast routing based on the data request message at application layer; and a plurality of data copying devices, each of which is made of a dedicated hardware circuit, for copying content data received from upstream to deliver each of copies of the content data to downstream based on the application-layer multicast routing, wherein said plurality of data copying devices communicate with the routing controller within the same segment to manage the content data to be relayed by the intermediate system using a management identification that is a port number corresponding to the content data uniquely assigned to the content data within the segment, wherein the routing controller manages said plurality of data copying devices, wherein each of the data copying devices works at layer 4 or lower, said plurality of data copying devices include a first data copying device and at least one other data copying device forming a hierarchical relationship for directly processing the content data on the same layer while bypassing the routing controller.

2. The application-layer multicast system according to claim 1, wherein the routing controller comprises:

a route manager for managing route information indicating a correspondence between the content data and the management identification, an upstream device address and at least one next hop address; and a controller for updating the route information when an update of the route information occurs and sending the update of the route information to said plurality of data copying devices.

3. The application-layer multicast system according to claim 2, wherein the route information further includes quality of service (QoS) of a route to said at least one next hop address.

4. The application-layer multicast system according to claim 1, wherein each of the plurality of the data copying devices comprise:

a copy entry controller for managing copy entry information indicating a correspondence between the management identification and at least one next hop address; and a data copying section for copying the content data received from upstream and replacing a destination address of the content data with a corresponding one of said at least one next hop address before delivering.

5. The application-layer multicast system according to claim 4, wherein the copy entry information further includes quality of service (QoS) of a route to said at least one next hop address.

6. An intermediate system in an application-layer multicast network for multicast content data from a sender to a plurality of receivers through the intermediate system on a unicast network based on a data request message of each of the receivers, comprises:

a routing controller controlling application-layer multicast routing based on the data request message at application layer; and a plurality of data copying devices, each of which is made of a dedicated hardware circuit, for copying content data received from upstream to deliver each of copies of the content data to downstream based on the application-layer multicast routing, wherein said plurality of data copying devices communicate with the routing controller within a same segment to manage the content data to be relayed by the intermediate system using a management identification that is a port number corresponding to the content data uniquely assigned to the content data within the segment, wherein the routing controller manages said plurality of data copying devices, wherein each of the data copying devices works at layer 4 or lower, said plurality of data copying devices include a first data copying device and at least one other data copying device forming a hierarchical relationship for directly processing the content data on the same layer while bypassing the routing controller.

7. The intermediate system according to claim 6, wherein the routing controller comprises:

a route manager for managing route information indicating a correspondence between the content data and the management identification, an upstream device address and at least one next hop address; and a controller for updating the route information when an update of the route information occurs and sending the update of the route information to said plurality of data copying devices, and each of said plurality of data copying devices comprise:

a copy entry controller for managing copy entry information indicating a correspondence between the management identification and said at least one next hop address; and a data copying section for copying the content data received from upstream and replacing a destination address of the content data with a corresponding one of said at least one next hop address before delivering.

8. An application-layer multicast method for multicast content data from a sender to a plurality of receivers through an intermediate system on a unicast network based on a data request message of each of the receivers, wherein the intermediate system comprises:

a routing controller controlling application-layer multicast routing based on the data request message at application layer; and a plurality of data copying devices, each of which is made of a dedicated hardware circuit and copies content data received from upstream to deliver each of copies of the content data to downstream, said plurality of data copying devices include a first data copying device and at least one other data copying device, said first data copying device and said at least one other data copying device forming a hierarchical relationship for directly processing the content data on the same layer while bypassing the routing controller, said method comprising the steps of:

at the routing controller, managing route information indicating a correspondence between the content data and a management identification that is a port number corresponding to the content data uniquely assigned to the content data within a segment, an upstream device address and at least one next hop address;

updating the route information when an update of the route information occurs;

sending the update of the route information to data copying devices;

at each of the data copying devices, managing copy entry information indicating a correspondence between the management identification and said at least one next hop address; and copying the content data received from upstream and replacing a destination address of the content data with a corresponding one of said at least one next hop address before delivering.

* * * * *